(12) United States Patent
Gu et al.

(10) Patent No.: US 8,787,892 B2
(45) Date of Patent: Jul. 22, 2014

(54) MOBILE TERMINAL AND METHOD OF CONTROLLING THE MOBILE TERMINAL

(75) Inventors: Heummo Gu, Seoul (KR); Sanghoon Shin, Seoul (KR); Jindoo Seol, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 12/851,204

(22) Filed: Aug. 5, 2010

(65) Prior Publication Data

US 2011/0034208 A1    Feb. 10, 2011

(30) Foreign Application Priority Data

Aug. 10, 2009  (KR) .................. 10-2009-0073425

(51) Int. Cl.
*H04M 3/00*    (2006.01)
(52) U.S. Cl.
USPC ......................................... 455/418; 370/338
(58) Field of Classification Search
USPC ......... 455/412.2, 420, 567; 348/14.01–14.07; 370/338
See application file for complete search history.

(56) References Cited

U.S. PATENT DOCUMENTS

| | | | |
|---|---|---|---|
| 8,370,762 B2 * | 2/2013 | Abbott | ......................... 715/769 |
| 2007/0082710 A1 | 4/2007 | Jang | |
| 2007/0150842 A1 | 6/2007 | Chaudhri et al. | |
| 2007/0177803 A1 | 8/2007 | Elias et al. | |
| 2007/0281666 A1 * | 12/2007 | Yoshida | ....................... 455/411 |
| 2009/0005088 A1 | 1/2009 | Hsu | |
| 2009/0149156 A1 | 6/2009 | Yeo | |
| 2009/0177981 A1 * | 7/2009 | Christie et al. | ................ 715/758 |
| 2010/0083190 A1 * | 4/2010 | Roberts et al. | ................ 715/863 |
| 2010/0146437 A1 * | 6/2010 | Woodcock et al. | ........... 715/806 |
| 2010/0156676 A1 * | 6/2010 | Mooring et al. | ................ 341/20 |

* cited by examiner

*Primary Examiner* — Marcos Batista
(74) *Attorney, Agent, or Firm* — Birch, Stewart, Kolasch & Birch, LLP

(57) ABSTRACT

A mobile terminal and a method of controlling the mobile terminal are provided. The method includes locking the mobile terminal; if a communication event occurs, displaying communication event alert information on a display module; and if a predefined gesture input is received in connection with the communication event alert information, unlocking the mobile terminal and entering an operating mode corresponding to the communication event. Therefore, it is possible to readily unlock the mobile terminal and place the mobile terminal in any operating mode in response to a gesture input.

10 Claims, 12 Drawing Sheets

(a)           (b)

(a)   (b)

(a)   (b)

(a)                    (b)

(a)　　　　　　　　　　　(b)

(a)　　　　　　　　　　　(b)

MOBILE TERMINAL AND METHOD OF CONTROLLING THE MOBILE TERMINAL

CROSS-REFERENCE TO RELATED APPLICATION

This application claims the priority benefit of Korean Patent Application No. 10-2009-0073425, filed on Aug. 10, 2009 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, in which various operations performed by the mobile terminal can be effectively controlled in response to a gesture input.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, various equipment such as a double-sided liquid crystal display (LCD) or a full touch screen is being applied to mobile terminals.

However, there is a restriction in allocating sufficient space for a UI without compromising the mobility and the portability of the mobile terminal. Therefore, it is necessary to develop ways to control the operation of a mobile terminal using a new data input method, other than an existing menu-based data input method, and thus efficiently use various functions provided by the mobile terminal.

SUMMARY OF THE INVENTION

The present invention provides a mobile terminal and a method of controlling the mobile terminal, in which various operations performed by the mobile terminal can be effectively controlled in response to a gesture input.

According to an aspect of the present invention, there is provided a method of controlling a mobile terminal, the method including placing the mobile terminal to a lock state; if a communication event occurs, displaying communication event alert information on a display module; and if a predefined gesture input is received in connection with the communication event alert information, releasing the mobile terminal from the lock state and entering an operating mode corresponding to the communication event.

According to another aspect of the present invention, there is provided a mobile terminal including a display module; and a controller configured to display communication event alert information on a display module if a communication event occurs when the mobile terminal is placed in a lock state, wherein, if a predefined gesture input is received in connection with the communication event alert information, the controller releases the mobile terminal from the lock state and enters an operating mode corresponding to the communication event.

According to another aspect of the present invention, there is provided a method of controlling a mobile terminal, the method including displaying an operation screen on a display module; receiving a multi-gesture input including first and second gesture inputs; and if there are one or more characters represented by the multi-gesture input, displaying a menu or an item list whose name includes the characters represented by the multi-gesture input on the display module.

According to another aspect of the present invention, there is provided a mobile terminal including a display module configured to display an operation screen; and a controller configured to receive a multi-gesture input including first and second gesture inputs, wherein, if there are one or more characters represented by the multi-gesture input, the controller displays a menu or an item list whose name includes the characters represented by the multi-gesture input on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
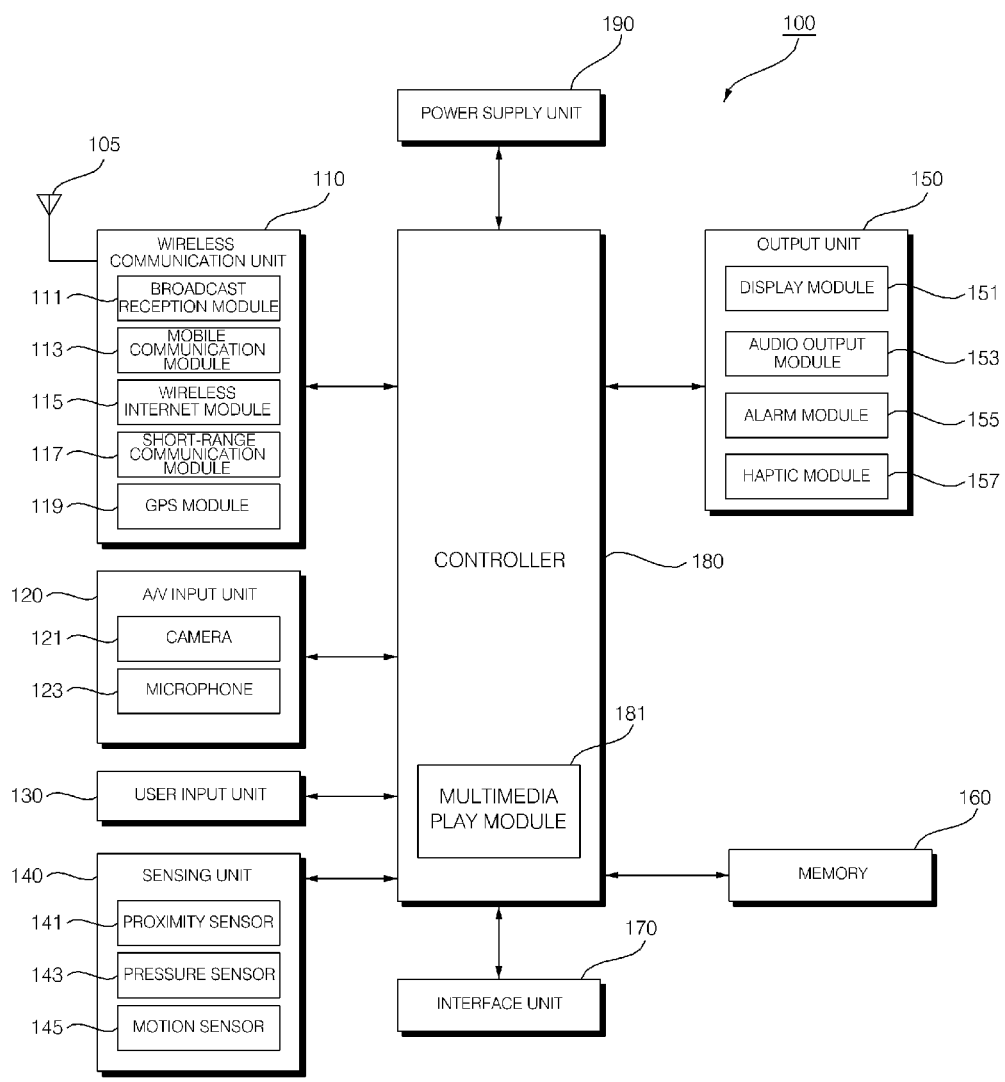
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals. The microphone 123 may be configured to properly receive the user's voice or other sounds.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
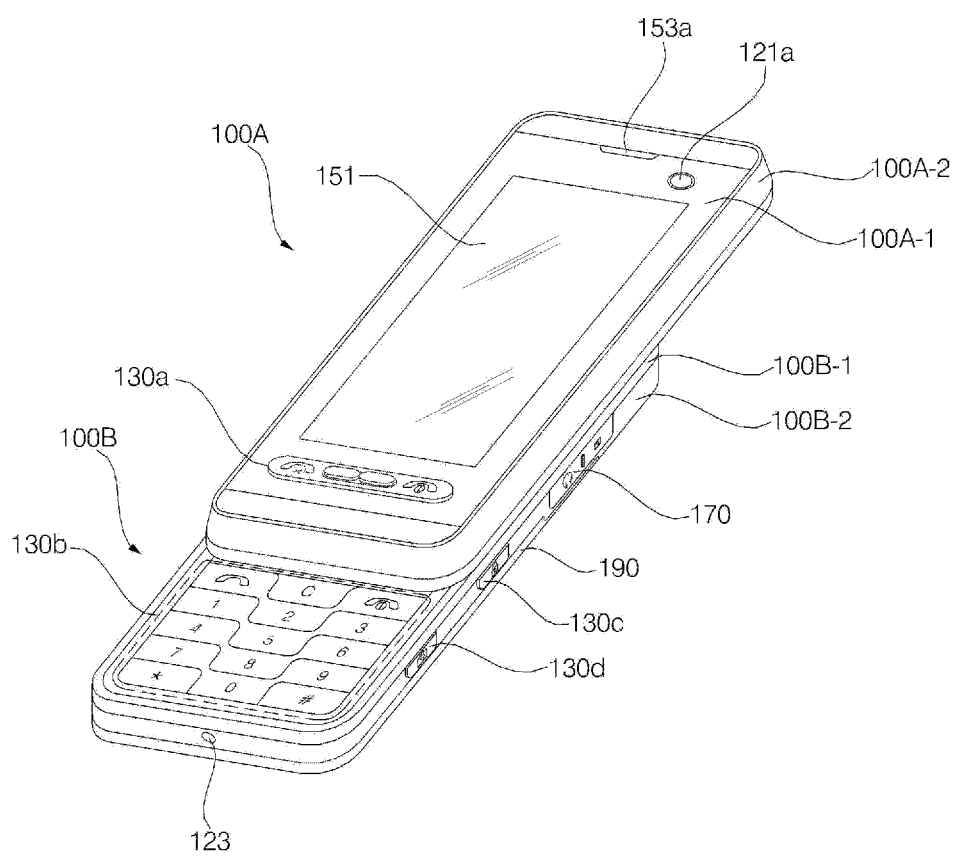
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input unit 130a may be disposed in the first body 100A, and particularly, in the front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The exterior of the second body 100B may be defined by a second front case 100B-1 and a second rear case 100B-2. A second user input unit 130b may be disposed in the second body 100B, and particularly, at the front of the second front case 100B-1. Third and fourth user input units 130c and 130d, the microphone 123 and the interface unit 170 may be provided in the second front case 100B-1 or the second rear case 100B-2.

The first through fourth user input units 130a through 130d may be collectively referred to as the user input unit 130. The user input unit 130 may adopt various manipulation methods as long as it can offer tactile feedback to the user.

The first user input unit 130a may allow the user to input various commands such as 'start', 'end', and 'scroll' to the mobile terminal 100, the second user input unit 130b may be used to input various numerals, characters or symbols, and the third and fourth user input units 130c and 130d may be used as hot keys for activating certain functions of the mobile terminal 100.

Figure 3:
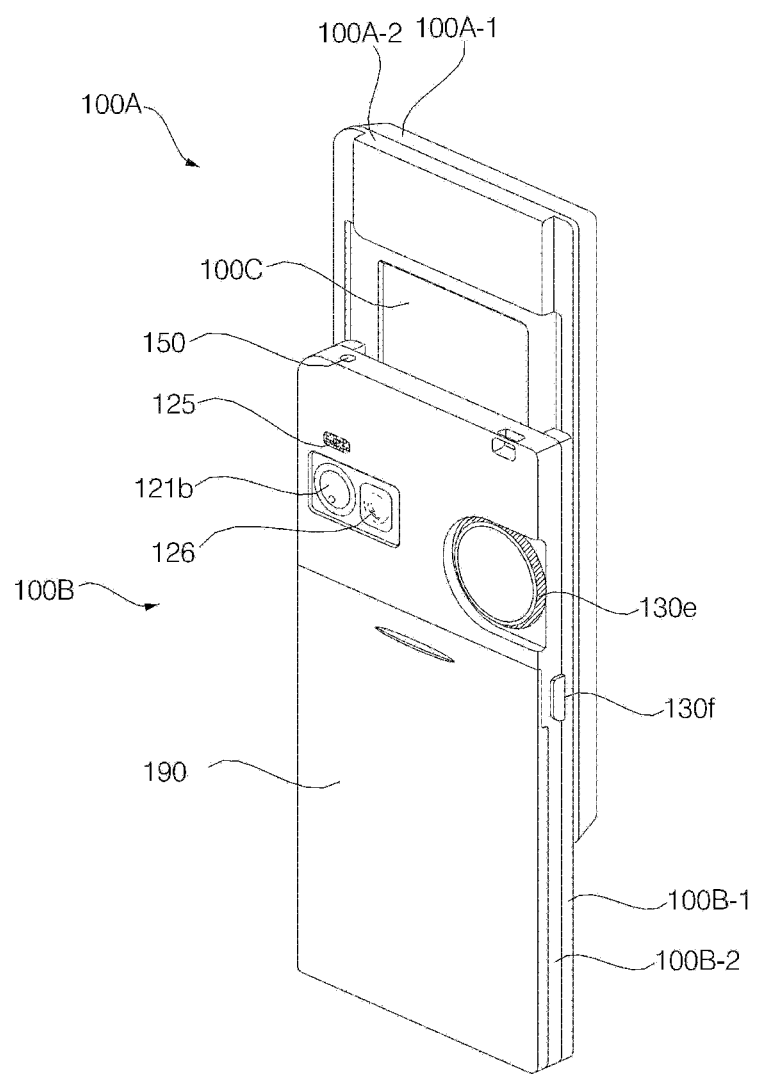
FIG. 3 illustrates a rear perspective view of the mobile terminal shown in FIG. 1.

FIG. 3 illustrates a rear perspective view of the mobile terminal 100 shown in FIG. 2. Referring to FIG. 3, the fifth user input unit 130e, which is of a wheel type, and the second camera 121b may be disposed at the rear of the second rear case 100B-2 of the second body 100B, and a sixth user input unit 130f may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A camera flash 125 and a mirror 126 may be disposed near the second camera 121b. The camera flash 125 may be used to illuminate a subject when the user attempts to capture an image of the subject with the second camera 121b. The mirror 126 may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The second camera 121b and the other elements that have been described as being provided on the rear case 100A-2 may be provided on the front case 100A-1. In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

Figure 4:
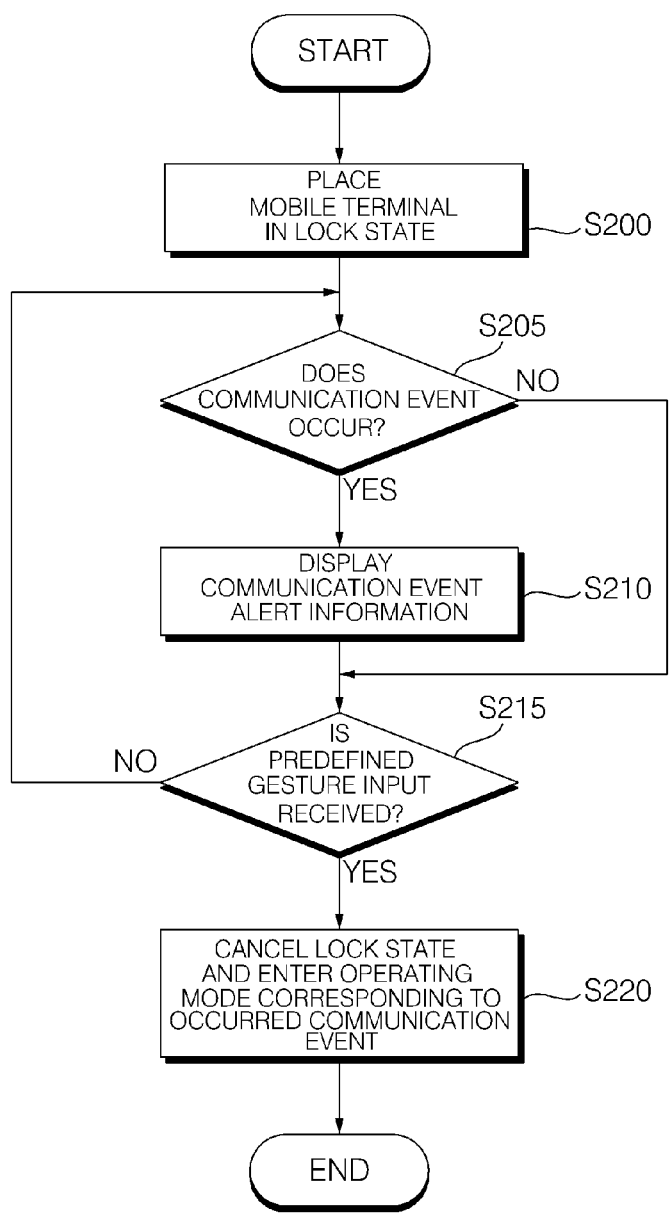
FIG. 4 illustrates a flowchart of a method of controlling a mobile terminal according to an exemplary embodiment of the present invention.

FIG. 4 illustrates a flowchart of a method of controlling a mobile terminal according to an exemplary embodiment of the present invention. Referring to FIG. 4, if no such user input as a touch input or a key input has been detected for more than a predefined amount of time or if a lock command has been issued by the user, the controller 180 may place the mobile terminal 100 in a protection state or a locked state (S200). When locked, the mobile terminal 100 does not respond to any touch- or key input.

Thereafter, if a communication event such as an incoming call, an incoming message or an incoming email occurs (S205), the controller 180 may display communication event alert information on the display module 151 (S210).

Thereafter, the controller 180 may determine whether a predefined gesture input has been received via the display module 151 in response to the communication event alert information (S215).

The predefined gesture input may be a touch-and-drag input with a predefined drag trajectory. The mobile terminal 100 may include the proximity sensor 141 and can thus detect a proximity-touch input. In this case, the predefined gesture input may be a proximity-touch input generated by moving a finger over the display module 151 in a predefined manner within a close vicinity of the surface of the display module 151. The type of the predefined gesture input may be determined in advance by the user or may be determined as a default at the time of manufacture of the mobile terminal 100.

If it is determined in operation S215 that the predefined gesture input has been received in response to the communication event alert information, the controller 180 may release the mobile terminal 100 from the lock state, and may place the mobile terminal 100 in an operating mode corresponding to the occurred communication event (S220).

In this manner, it is possible for the mobile terminal 100 to be readily released from a lock state and then enter any desired operating mode in response to the predefined gesture mode.

Figure 5:
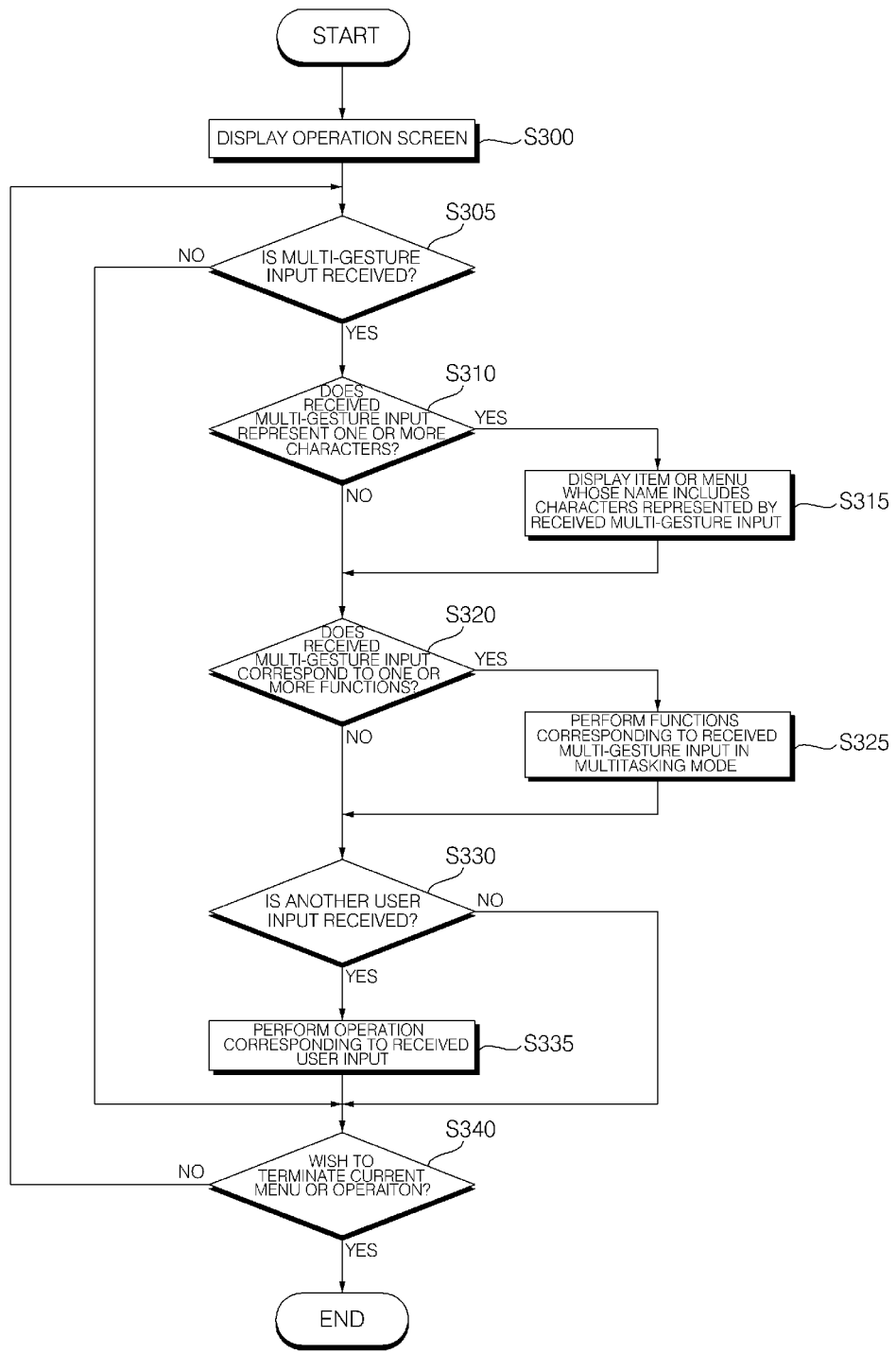
FIG. 5 illustrates a flowchart of a method of controlling a mobile terminal according to another exemplary embodiment of the present invention.
Figure 6:
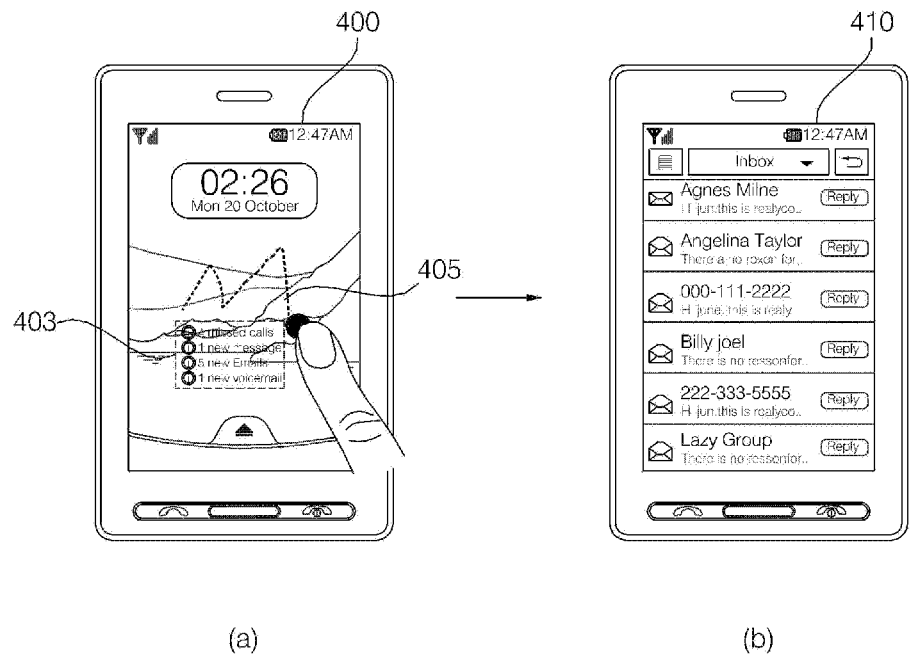
FIGS. 6 through 9 illustrate diagrams for explaining how to perform an operation such as cancelling a locked state in response to a gesture input.
Figure 7:
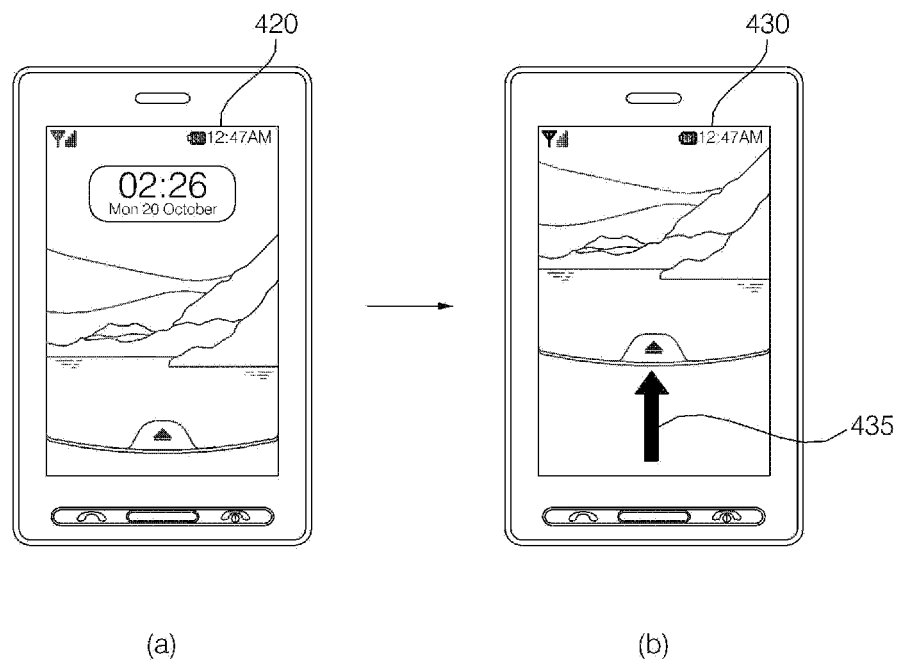

FIG. 5 illustrates a flowchart of a method of controlling a mobile terminal according to another exemplary embodiment of the present invention. In the exemplary embodiment of FIG. 5, a multi-gesture input may be defined as two or more gesture inputs detected in a row within a short time.

Referring to FIG. 5, the controller 180 may display an operation screen corresponding to a menu or operation selected by the user on the display module 151 (S300). Examples of the operation screen include an idle screen, a message-receiving screen, a message-sending screen, a main menu screen, a still or moving image-viewer screen, a broadcast screen, a map screen and a webpage screen.

The controller 180 may determine whether there is a multi-gesture input received through the display module 151 (S305).

If there is a multi-gesture input received through the display module 151 and the received multi-gesture input represents one or more characters (S310), the controller 180 may search for an item or menu whose name includes the characters represented by the received multi-gesture input, and may display the identified item or menu on the display module 151 (S315).

If there is a multi-gesture input received through the display module 151 and the received multi-gesture input represents one or more functions (S320), the controller 180 may control the functions represented by the received multi-gesture input to be performed at the same time in a multitasking mode (S325).

If there is another user input such as a touch input or a key input detected from the display module 151 (S330), the controller 180 may control an operation corresponding to the detected user input to be performed (S335). Alternatively, if a communication event such as receiving an incoming call or an incoming message occurs, the controller 180 may control an operation corresponding to the communication event to be performed.

Operations S305 through S335 may be repeatedly performed until the user chooses to terminate the current menu or operation (S340).

In this manner, it is possible to perform one or more functions in a multitasking mode in response to a multi-gesture input.

FIGS. 6 through 15 illustrate diagrams for explaining the methods of the exemplary embodiments of FIGS. 4 and 5.

FIGS. 6 through 9 illustrate diagrams for explaining how to unlock the mobile terminal 100 in response to a gesture input. Referring to FIG. 6(a), if the mobile terminal 100 is locked, a locked screen 400 may be displayed on the display module 151. If a communication event occurs, communication event alert information 403 may be displayed on the locked screen 400. In this case, if a gesture input 405 with an M-shaped trajectory, which corresponds to a 'message' menu, is received, the mobile terminal 100 may be unlocked and may then enter the 'message' menu. As a result, referring to FIG. 6(b), an 'inbox' screen 410 may be displayed on the display module 151.

Similarly, if a gesture input with a predefined trajectory corresponding to a 'call' menu or an 'email' menu is received, the mobile terminal 100 may also be unlocked and may then enter the 'call' menu or the 'email' menu.

When a gesture input is being made, its trajectory may be displayed on the display module 151. Then, if the trajectory of the gesture input is recognized, a gesture icon corresponding to the recognized gesture input trajectory may be displayed on the display module 151, and a function corresponding to the gesture icon may be performed. A gesture input can be recognized only in a certain part of the locked screen 400.

Referring to FIGS. 7(a) and 7(b), if the mobile terminal 100 is placed in a lock state and thus a locked screen 420 is displayed on the display module 151, but without any communication event alert information displayed thereon, the mobile terminal 100 may be released from the lock state in response to the reception of a predefined gesture input, for example, a gesture input 435 for sliding up the locked screen 420.

Figure 8:
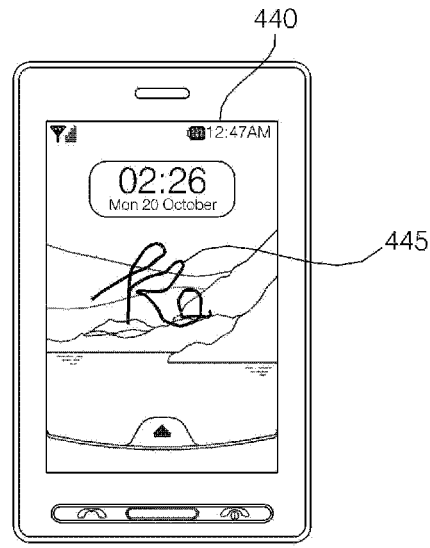
Figure 9:
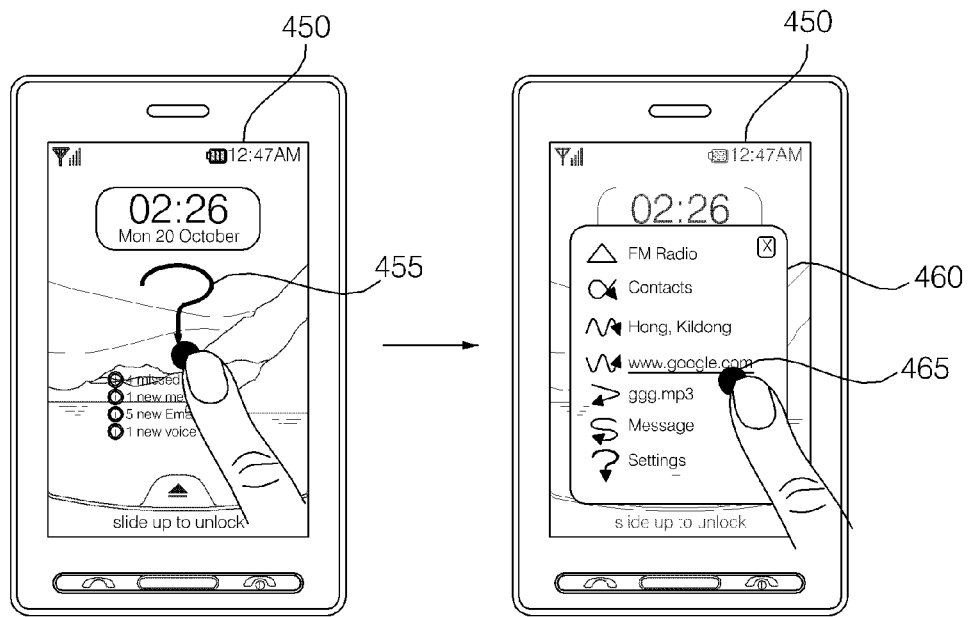

Referring to FIG. 8, the mobile terminal 100 may be configured to be able to be unlocked in response to the detection of a user-defined gesture input 445 from a locked screen 440. In this case, the user-defined gesture input 445 may serve as a password for unlocking the mobile terminal 100.

Referring to FIGS. 9(a) and 9(b), if a gesture input 455 with a question mark-shaped trajectory is received, a 'help' popup window 460 including a plurality of items each showing a previously-registered gesture input and the function of the previously-registered gesture input may be displayed.

If one of the items included in the 'help' popup window 460 is selected, a function corresponding to the selected item may be performed. For example, if a touch input 465 for selecting an item showing an address 'www.google.com' is received, a website corresponding to the address 'www.google.com' may be accessed.

If the gesture input 455 is received when there is no gesture input registered in the mobile terminal 100 or if the gesture input 455 is received when the 'help' popup window 460 is displayed, a menu for registering a new gesture input may be executed, and thus, the user may register a new gesture input or edit an existing gesture input.

Figure 10:
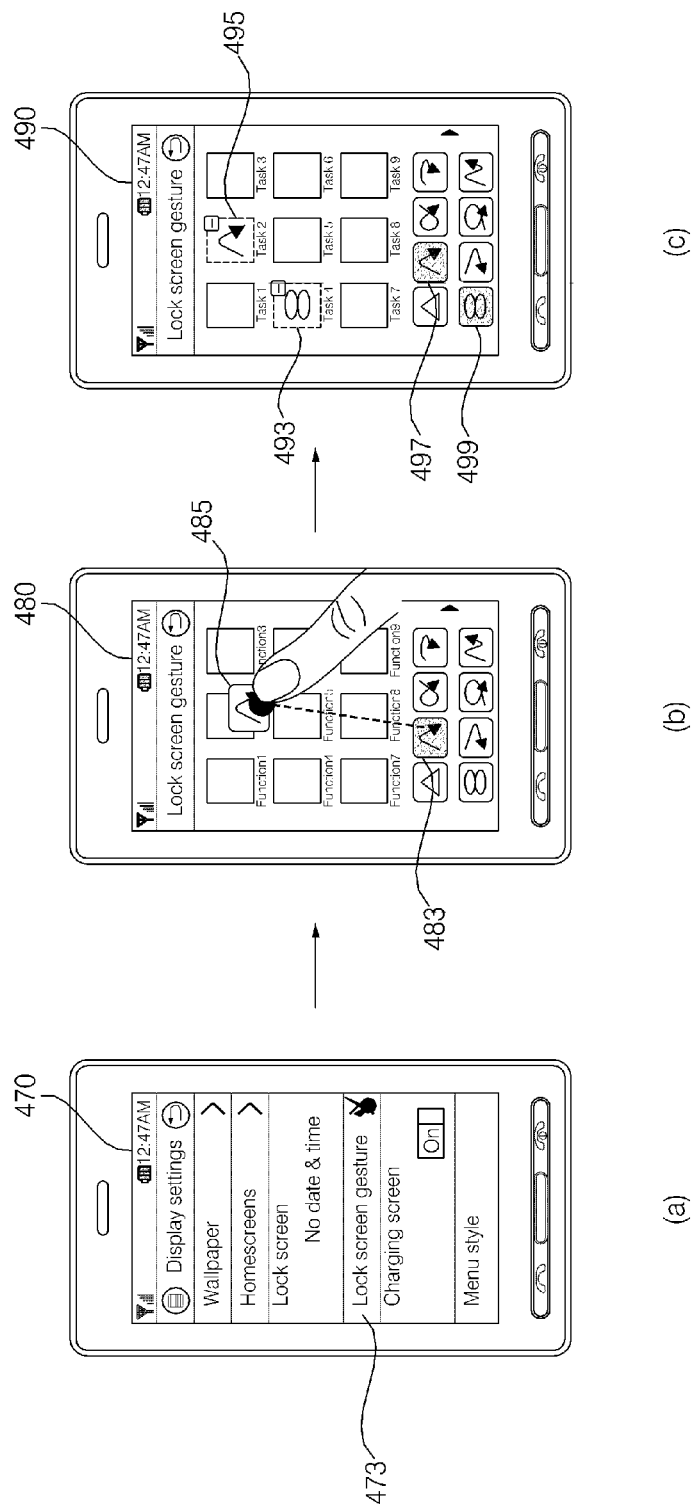
FIGS. 10 through 12 illustrate diagrams for explaining how to register a gesture input.
Figure 11:
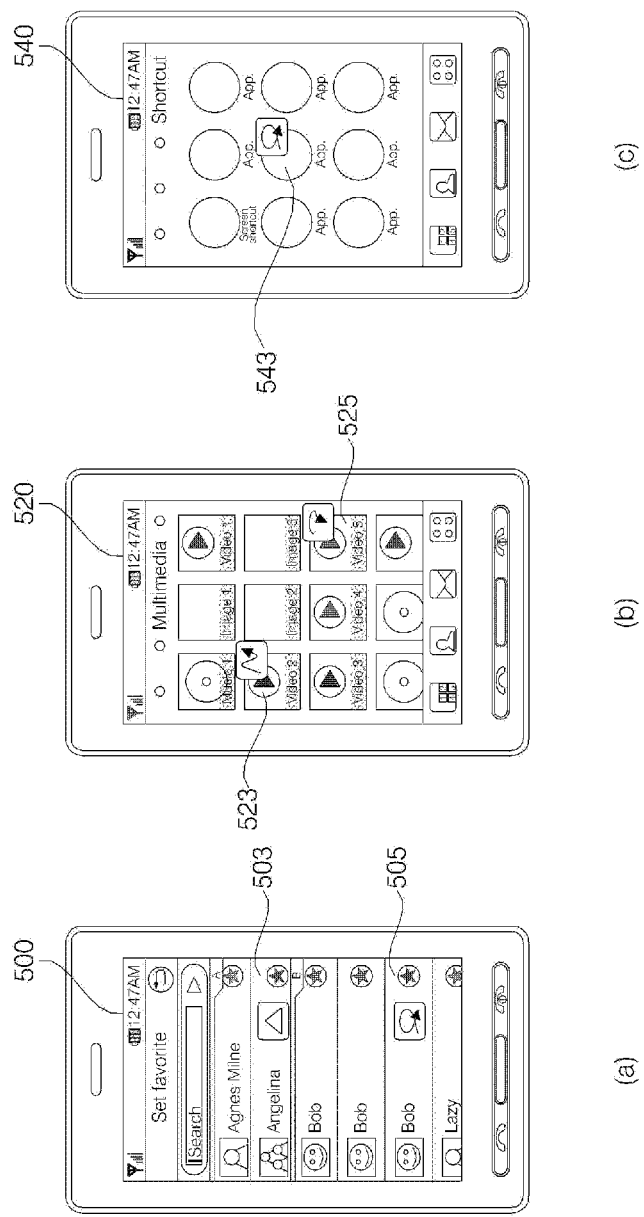
Figure 12:
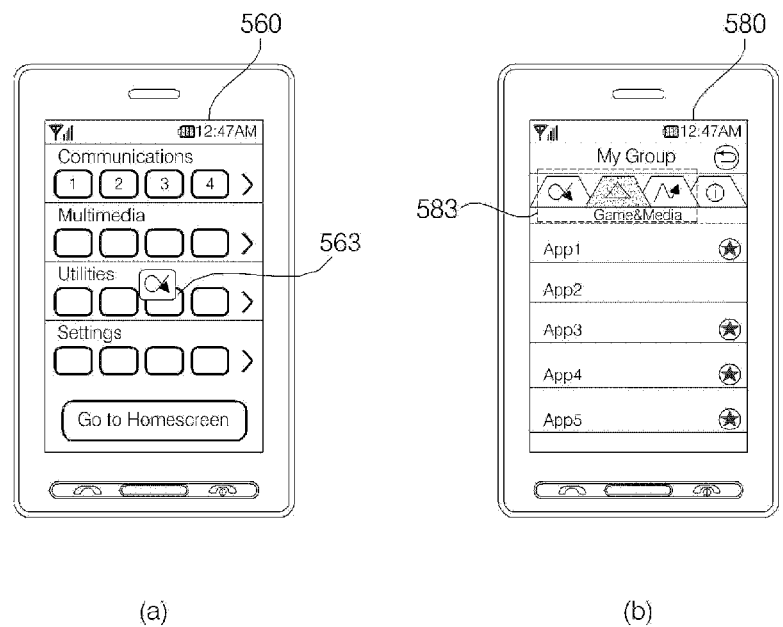

FIGS. 10 through 12 illustrate diagrams for explaining how to register a gesture input. Referring to FIG. 10(a), a gesture item 473 for setting a new gesture input that can be recognized even when the mobile terminal 100 is locked may be added to a 'display settings' screen 470.

Referring to FIG. 10(b), if the gesture item 473 is selected, a 'lock screen gesture' screen 480 may be displayed on the display module 151. A plurality of function icons may be displayed on an upper part of the 'lock screen gesture' screen 480, and a plurality of gesture icons may be displayed on a lower part of the 'lock screen gesture' screen 480. If one of the gesture icons, e.g., a gesture icon 483, is dragged and dropped onto a function icon 485, a gesture input represented by the gesture icon 483 may be associated with a function represented by the function icon 485.

Referring to FIG. 10(c), a gesture icon representing a gesture input already associated with a function may appear differently from other gesture icons so as to be easily recognizable, as indicated by reference numerals 497 and 499. In addition, the gesture icon may also be displayed over a function icon corresponding to the function, as indicated by reference numerals 493 and 495, so as for the function icon to be easily distinguishable from other function icons representing functions yet to be associated with gesture inputs. Even after the association between functions and gesture inputs is established, the functions may swap gesture inputs with each other.

FIG. 11 illustrates diagrams for explaining how to associate an item or function with a gesture input. Referring to FIG. 11(a), each item in a phone number list displayed on a 'set favorites' screen 500 may be associated with a gesture input.

Once the association between an item in the phone number list and a gesture input is established, a gesture icon representing the gesture input may be displayed in the item, as indicated by reference numerals 503 and 505.

Referring to FIG. 11(b), each multimedia file displayed on a 'multimedia' screen 520 may be associated with a gesture input.

Referring to FIG. 11(c), each application displayed on a shortcut menu screen 540 may be associated with a gesture input. In addition, each website may be associated with a gesture input. In this case, if a predefined gesture input is received, a website corresponding to the predefined gesture input may be readily accessed.

Referring to FIG. 12, each item group or function group may be associated with a gesture input. In this case, if a predefined gesture input is received, an item or function group corresponding to the received gesture input may be selected and displayed on the entire display module 151, and thus, the user may be allowed to selectively use any desired one of a number of items or functions classified into the selected item or function group.

More specifically, referring to FIG. 12(a), a plurality of groups displayed on a menu screen 560, i.e., a 'communications' group, a 'multimedia' group, a 'utilities' group and a 'settings' group, may be associated with different gesture inputs. In this case, if a predefined gesture input is received, one of the plurality of groups corresponding to the predefined gesture input may be selected and displayed on the entire display module, and thus, the user may be allowed to selectively use any desired one of a number of items or functions classified into the selected group. The 'utilities' group may be associated with a predetermined gesture input, as indicated by reference numeral 563. Referring to FIG. 12(b), a plurality of menu groups may be displayed on a menu screen 580 as tabs, and each of the tabs may be associated with a gesture input.

Figure 13:
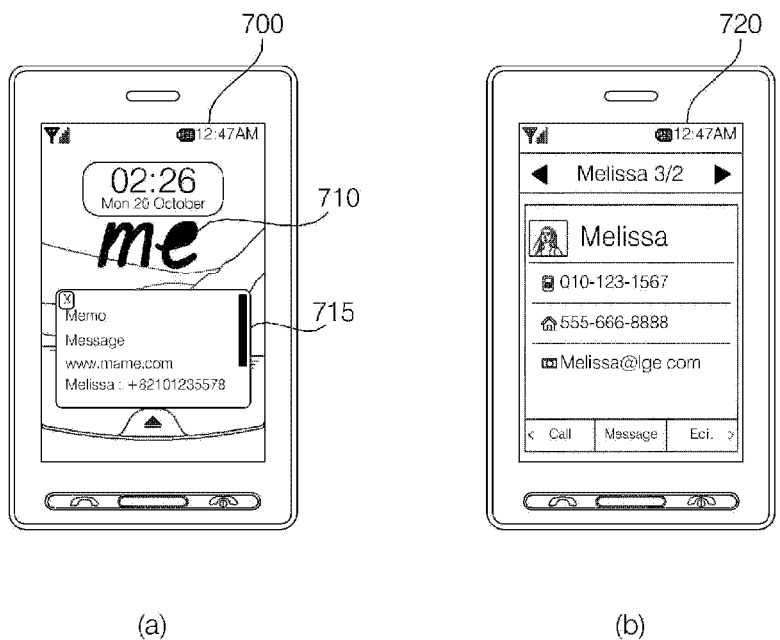
FIG. 13 illustrates diagrams for explaining how to perform an operation in response to a multi-gesture input.

FIG. 13 illustrates diagrams for explaining how to perform an operation in response to a multi-gesture input. Referring to FIG. 13(a), if a multi-gesture input 710 representing the alphabet letters 'm' and 'e' is received, a list of menu items 715 whose names include both the alphabet letters 'm' and 'e' may be displayed.

If one of the menu items 715, for example, a 'message' menu item is selected, a message menu screen 720 may be displayed, as shown in FIG. 13(b).

If a multi-gesture input is received when a predetermined menu item is being executed, a list of items whose names include one or more characters represented by the multi-gesture input may be displayed. For example, if the multi-gesture input 710 is received when a phonebook menu is being executed, the name of a phonebook entry including the alphabet letters 'm' and 'e,' e.g., 'Melissa,' may be displayed.

Figure 14:
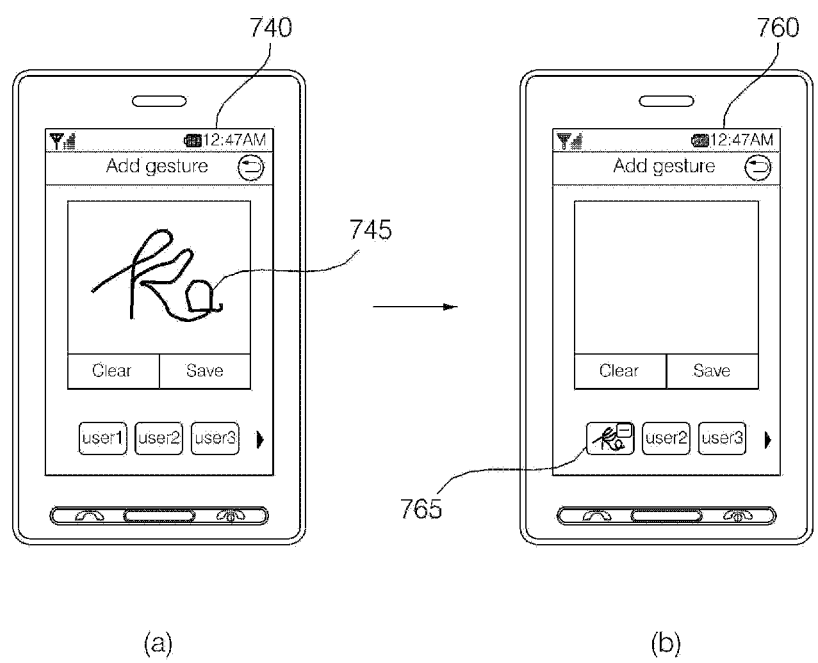
FIG. 14 illustrates diagrams for explaining how to register a gesture input desired by a user.

FIG. 14 illustrates diagrams for explaining how to register a gesture input desired by the user. Referring to FIG. 14(a), the user may input any desired sign or symbol 745 and may then register the input sign or symbol as a gesture input. Thereafter, referring to FIG. 14(b), a gesture icon 765 representing the gesture input may be displayed. The user may register two or more letters or symbols as a single gesture input, and may delete a gesture input previously registered in the mobile terminal 100.

Figure 15:
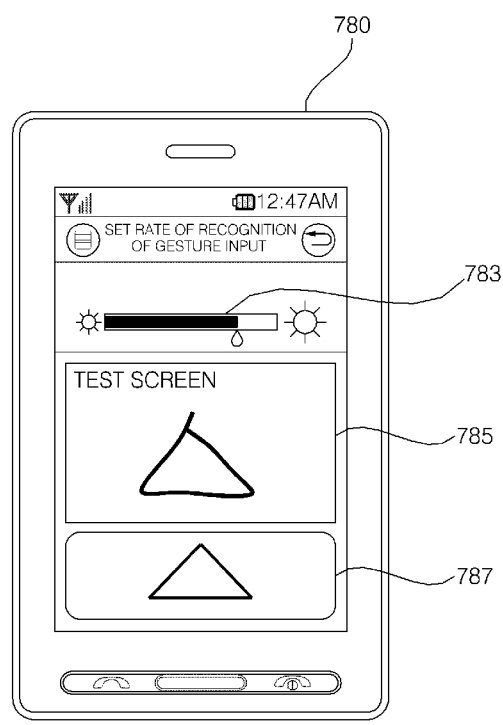
FIG. 15 illustrates diagrams for explaining how to set the rate of recognition of a gesture input.

FIG. 15 illustrates a diagram of a screen 780 for setting the rate of recognition of a gesture input. Referring to FIG. 15, the user may set the rate of recognition of a gesture input by using an adjustment bar 783 provided on the screen 780. Thereafter, the user may test the result of the setting by generating a gesture input in a test area 785 provided on the screen 780.

The generated gesture input may be recognized, and the result of the recognition may be displayed in a recognition result area 787.

The mobile terminal 100 may include, for example, a tactile sensor. In this case, the mobile terminal 100 can recognize a gesture input generated by the user only when held in his or her hand. That is, the mobile terminal 100 may not be able to recognize any gesture input when carried in a bag or pocket. In addition, it is possible to allow the user to choose whether the mobile terminal 100 should be able to recognize a gesture input.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to control various operations performed by a mobile terminal in response to a multi-gesture input. In addition, it is possible to improve the convenience of manipulation of a mobile terminal by using a gesture input and another type of user input (such as a touch input or a key input) together.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    setting a gesture input in response to a user input; placing the mobile terminal in a lock state;
    receiving a communication event;
    displaying alert information for notifying an occurrence of the communication event on a display module;
    receiving a predefined gesture input in connection with the alert information;
    displaying a trajectory of the gesture input upon receiving the predefined gesture input;
    if the trajectory of the gesture input is successfully recognized, temporarily displaying a gesture icon corresponding to the recognized trajectory; and
    in response to the received gesture input, releasing the mobile terminal from the locked state, and entering an operating mode corresponding to the communication event,
    wherein the setting the gesture input comprises:
        selecting an item for setting the gesture input from a display setting screen;
        displaying a plurality of menus corresponding to a plurality of operational functions on a first area of a display module and a plurality of gesture icons corresponding to a plurality of gesture inputs on a second area of the display module; and
        associating a different gesture input with each menu in response to a touch input generated by dragging and dropping one of the plurality of gesture icons onto one of the plurality of menus.

2. The method of claim 1, wherein the communication event includes receiving a message, receiving a call and receiving email.

3. The method of claim 1, wherein each predefined gesture input is a user input generated by touching and dragging on the display module in a predefined manner.

4. The method of claim 1, further comprising receiving a predefined gesture input for displaying 'help' information; and
    displaying a 'help' window showing a plurality of previously-registered gesture inputs and their functions on the display module.

5. The method of claim 1, further comprising providing a menu for adjusting the rate of recognition of each gesture input.

6. The method of claim 1, wherein the plurality of menus comprises a message menu, a call menu and an email menu.

7. A mobile terminal comprising:
    a display module; and
    a controller configured to:
        set a gesture input in response to a user input;
        place the mobile terminal in a lock state;
        display an alert information for notifying an occurrence of a communication event on a display module if the communication event is occurred during the lock state; and
        in response to a predefined gesture input being received in connection with the alert information, release the mobile terminal from the locked state and enter an operating mode corresponding to the communication event,
    wherein the controller is configured to display a trajectory of the gesture input upon receiving the predefined gesture input, and temporarily display a gesture icon corresponding to a recognized trajectory if the trajectory of the gesture input is successfully recognized, and
    wherein the controller is further configured to select an item for setting the gesture input from a display setting screen, display a plurality of menus corresponding to a plurality of operational functions on a first area of a display module and a plurality of gesture icons corresponding to a plurality of gesture inputs on a second area of the display module, and associate a different gesture input with each menu in response to a touch input generated by dragging and dropping one of the plurality of gesture icons onto one of the plurality of menus.

8. The mobile terminal of claim 7, wherein each predefined gesture input is a user input generated by touching and dragging on the display module in a predefined manner.

9. The mobile terminal of claim 7, wherein, if a predefined gesture input for displaying 'help' information is received, the controller displays a 'help' window showing a plurality of previously-registered gesture inputs and their functions on the display module.

10. The mobile terminal of claim 7, wherein the plurality of menus comprise a message menu, a call menu and an email menu.

* * * * *